United States Patent
de Kort et al.

(10) Patent No.: US 11,941,260 B2
(45) Date of Patent: Mar. 26, 2024

(54) SOFTWARE FILTERED MEMORY DEVICES IN COMPUTING SYSTEMS

(71) Applicant: Microsoft Technology Licensing, LLC, Redmond, WA (US)

(72) Inventors: Martijn de Kort, Mill Creek, WA (US); David Hepkin, Redmond, WA (US); Murtaza Ghiya, Redmond, WA (US); Liang Yang, Redmond, WA (US); Matthew David Kurjanowicz, North Bend, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/833,825

(22) Filed: Jun. 6, 2022

(65) Prior Publication Data
US 2022/0413717 A1  Dec. 29, 2022

Related U.S. Application Data

(60) Continuation of application No. 17/188,835, filed on Mar. 1, 2021, now Pat. No. 11,385,809, which is a
(Continued)

(51) Int. Cl.
G06F 3/06 (2006.01)
(52) U.S. Cl.
CPC .......... *G06F 3/0622* (2013.01); *G06F 3/0637* (2013.01); *G06F 3/0659* (2013.01); *G06F 3/0679* (2013.01)

(58) Field of Classification Search
None
See application file for complete search history.

(56) References Cited

U.S. PATENT DOCUMENTS 10,282,103 B1* 5/2019 Stone ...................... G06F 13/24
2015/0347017 A1* 12/2015 Shacham ............. G06F 3/0688
711/103

(Continued)

OTHER PUBLICATIONS

"Office Action Issued in European Patent Application No. 19742111.8", dated Dec. 20, 2022, 8 Pages.
(Continued)

*Primary Examiner* — Tracy C Chan
(74) *Attorney, Agent, or Firm* — Newport IP, LLC; Jacob P. Rohwer

(57) ABSTRACT

Techniques of implementing software filtered non-volatile memory in a computing device are disclosed herein. In one embodiment, a method includes detecting an entry being written to a guest admin submission queue (gASQ) by a memory driver of a virtual machine hosted on the computing device. Upon detecting the entry written to the gASQ by the memory driver, the command in the entry is analyzed to determine whether the command is allowed based on a list of allowed or disallowed commands. In response to determining that the command in the entry is not allowed, without sending the command to the non-volatile memory, generating an execution result of the command in response to the entry being written to the gASQ by the memory driver. As such, potentially harmful commands from the memory driver are prevented from being executed by the non-volatile memory.

17 Claims, 11 Drawing Sheets

Related U.S. Application Data division of application No. 16/137,382, filed on Sep. 20, 2018, now Pat. No. 10,969,973.

(56) References Cited

U.S. PATENT DOCUMENTS

| | | | | |
|---|---|---|---|---|
| 2016/0292007 | A1* | 10/2016 | Ding | G06F 9/5077 |
| 2017/0075824 | A1* | 3/2017 | Haen | G06F 12/00 |
| 2018/0004559 | A1* | 1/2018 | Geml | G06F 21/6209 |
| 2018/0321879 | A1* | 11/2018 | Lu | G06F 3/0604 |
| 2019/0369913 | A1* | 12/2019 | Hahn | G06F 3/0619 |
| 2021/0124662 | A1* | 4/2021 | Das | G06F 9/45558 |
| 2021/0342173 | A1* | 11/2021 | Tsirkin | G06F 9/4812 |

OTHER PUBLICATIONS

"Office Action Issued in European Patent Application No. 19742111.8", dated Dec. 20, 2002, 8 Pages.

Communication pursuant to Article 93(3) Received for European Application No. 19742111.8, dated Jan. 31, 2024, 10 pages.

\* cited by examiner

SOFTWARE FILTERED MEMORY DEVICES IN COMPUTING SYSTEMS

CROSS-REFERENCE TO RELATED APPLICATION(S)

This application is a Continuation of and claims priority to U.S. patent application Ser. No. 17/188,835, filed on Mar. 1, 2021, which is a Divisional of and claims priority to U.S. patent application Ser. No. 16/137,382, filed on Sep. 20, 2018, the disclosures of which are incorporated herein in their entirety.

BACKGROUND

Cloud computing allows multiple users to access and share pools of computing resources over a computer network, such as the Internet. Such shared computing resources can include a large number of servers, network storage devices, and other computing devices interconnected routers, switches, bridges, load balancers, or other network devices in a datacenter. Individual servers can host virtual machines, virtual switches, or other types of virtualized functions configured to provide computation, communications, data storage, or other suitable types of computing services to multiple users. Such computing services are referred to generally as "cloud computing services" or "cloud services."

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Non-Volatile Memory express (NVMe) is a logical device interface specification for accessing non-volatile memories ("NVMs") attached to a computing device (e.g., a server) via a Peripheral Component Interconnect express (PCIe) bus. NVMe allows host hardware and/or software to have full access to hard disk drives (HDDs), solid state devices (SSDs) or other non-volatile memories. For example, an SSD attached to a server can be directly assigned to a virtual machines (or other types of guest) hosted by the server via an NVMe interface as if the SSD is directly attached to the virtual machine. Such direct attachment via the NVMe interface can reduce input/output (I/O) overhead and latency of accessing data from the SSD by the virtual machine when compared to other logical-device interfaces.

One difficulty of assigning a non-volatile memory device or non-volatile memory controller to a virtual machine or guest is that the full access to the non-volatile memory may allow a user or application executing in the virtual machine to perform harmful operations on the non-volatile memory device. For example, a user may re-program firmware on the non-volatile memory device to negatively impact data security of other virtual machines on the same server. One solution for addressing the foregoing difficulty includes attaching the non-volatile memory device as a Small Computer System Interface (SCSI) drive. The drawback of this solution is an increased I/O overhead and latency when compared to an NVMe interface. Another solution includes installing customized Application Specific Integrated Circuit (ASIC) or firmware on the non-volatile memory device to disable certain functions, such as re-programming device firmware. Such a solution, however, can be costly to implement due to customization in hardware and/or software of a server. This solution can also be difficult to maintain because custom ASICs or firmware may be difficult to update.

Several embodiments of the disclosed technology can address at least some aspects of the foregoing difficulty by implementing a software filtered NVMe interface that protects a non-volatile memory device from guest attacks while allowing high performance in data access to the non-volatile memory. As such, harmful admin commands from a guest can be blocked from a non-volatile memory device when the non-volatile memory device is assigned to the guest. In certain implementations, a host can assign a non-volatile memory device (e.g., SSD) having a NVMe controller to a guest (e.g., a virtual machine or container). As such, the assigned non-volatile memory device may appear in a PCIe configuration space of the guest and allow direct access to the non-volatile memory device via the NVMe controller.

In accordance with embodiments of the disclosed technology, when the guest requests to create guest admin queues (e.g., guest admin submission queue and guest admin completion queue) configured to hold admin commands and completion results thereof, the host can intercept the request and creates additional host admin queues (e.g., host admin submission queue and host admin completion queue corresponding to the respective guest admin queues. The host admin queues are linked to the NVMe controller of the non-volatile memory while the guest admin queues are not directly linked to the NVMe controller. For example, the NVMe controller can be configured to receive admin commands from and write completion results to the host admin queues but not the guest admin queue. Instead, the guest admin queues are intercepted and virtualized by the host using the host admin queues, as explained in more detail below.

In operation, when the host detects that the guest is sending a command to the guest admin submission queue ("gASQ"), the host can either process the command itself by adding a admin completion entry directly to the guest admin completion queue ("gACQ"), or can forward the command to the NVMe controller by writing another entry representing the same command to the host admin submission queue ("hASQ"). The host can then write suitable data to a doorbell register ("DB") on the NVMe controller (referred to as "ring the doorbell") to inform the NVMe controller that a command is pending in the hASQ. In response, the NVMe controller can retrieve the command from the hASQ and process the retrieved command accordingly. Upon completion of processing the command, the NVMe controller can write processing results as an admin completion entry in the host admin completion queue ("hACQ"). During processing, the host can periodically poll the hACQ until the admin completion entry written by the NVMe is detected. The host can then write a completion entry to the gACQ representing the completion status of the original command retrieved from the gASQ. The completion entry written to the gACQ can be identical to the completion entry from the hACQ, or the host can modify the detected completion entry from the hACQ before writing the completion entry to the gACQ. One example modifications can include modifying a command ID associated with the completion entry. In another example, the completion entry from the hACQ can be filtered to remove certain data. For instance, if the NVMe controller reports data indicating support for "reprogramming firmware," the host can modify the reported data to "NOT supporting reprogramming firmware" before writing the completion entry to the gACQ, which can then be processed by the guest accordingly.

In accordance with several aspects of the disclosed technology, the foregoing virtualization scheme can allow software filtering of admin commands from the guest to the NVMe controller to prevent the guest from issuing harmful commands to the non-volatile memory. For example, upon detecting that a command is written into the hASQ or the guest is attempting to ring the doorbell of the NVMe controller, the host can retrieve and determine whether this command issued by the guest is safe based on, for example, a list of allowed and/or disallowed admin commands. For instance, commands related to re-programming firmware (e.g., a firmware commit command) or thermal management of the non-volatile memory may be disallowed. On the other hand, commands related to, for example, obtaining data from the non-volatile memory regarding power management, temperature control, error recovery, or other parameters of the non-volatile memory may be allowed.

Upon determining that the command is disallowed, the host can be configured to build a valid NVMe admin completion entry for this command without writing an entry containing the command in the hASQ. The built admin completion entry can contain various information such as data informing the guest that such a command is not allowed, and/or not supported. The host can then add the built admin completion entry into the gACQ and fires an interrupt for notifying the guest that a new entry is present in the gACQ. The guest can then process the completion entry from the gACQ suitably. As such, the command deemed by the host as harmful or otherwise disallowed is blocked from being executed by the NVMe controller of the non-volatile memory. On the other hand, upon determining that the command is allowed or allowable, the host can be configured to copy the command as a new entry to the hASQ and ring the doorbell to notify the NVMe controller of the new entry in the hASQ. The NVMe controller can then retrieve and process the command in the hASQ and generate a corresponding admin completion entry to the hACQ. The host can then copy the admin completion entry from the hACQ into the gACQ, as described above. Thus, by virtualizing the gASQ and gACQ, several embodiments of the disclosed technology can thus prevent a guest from directly issuing harmful admin commands to the NVMe controller of the non-volatile memory.

Though the foregoing technique is effective in preventing the guest from directly issuing harmful commands to the NVMe controller, continued software filtering of commands in the gASQ may generate high latency of processing commands from the guest and thus reduce data access performance of the non-volatile memory. To address the foregoing issue, several embodiments of the disclosed technology are also directed to operate the non-volatile memory in a filter mode or a unfiltered mode (referred to collectively as access modes) under certain conditions in order to achieve faster data access performance, as described below.

In the filtered mode, the gASQ and gACQ are fully virtualized such that any admin commands written into the gASQ are filtered to determine whether such commands are allowed. In contrast, in the unfiltered mode, the guest is allowed to access the non-volatile memory without software filtering, i.e., with full access to the non-volatile memory with hinderance from the host. In certain embodiments, the host can switch the access mode of the non-volatile memory based on whether a command has been detected in the gASQ. For example, when a new command to the gASQ has not been detected for a threshold period, the host can switch the non-volatile memory from the filtered mode to the unfiltered mode by removing intercept placed on the DB signals. In certain embodiments, before switching to the unfiltered mode, the host can first fill the hASQ with harmless admin commands, such as get-feature commands. As such, even if the guest rings the admin doorbell of the NVMe controller for processing a command, the NVMe controller would process a harmless command already in the hASQ without causing negative effects on the non-volatile memory. In other embodiments, the host can switch to unfiltered mode without filling the hASQ with any commands and/or perform other suitable actions.

While allowing the guest to access data in the non-volatile memory in the unfiltered mode, the host can continue to monitor for or intercept any admin commands written to the gASQ by the guest. Upon detecting that a new command is written into the gASQ, the host can switch data access to the non-volatile memory from the unfiltered mode to the filtered mode. In the filtered mode, the host can then determine whether the new command is allowed or disallowed and process accordingly, as described above. After processing the new command, the host can then switch back to unfiltered mode when no more new command is detected in the gASQ for another threshold period. As such, the host can allow the guest to directly access data in the non-volatile memory as long as the guest does not issue any admin commands by writing entries in the gASQ. As such, data access by the guest to the non-volatile memory can be improved when compared to continuous software filtering by the host.

DETAILED DESCRIPTION

Figure 1:
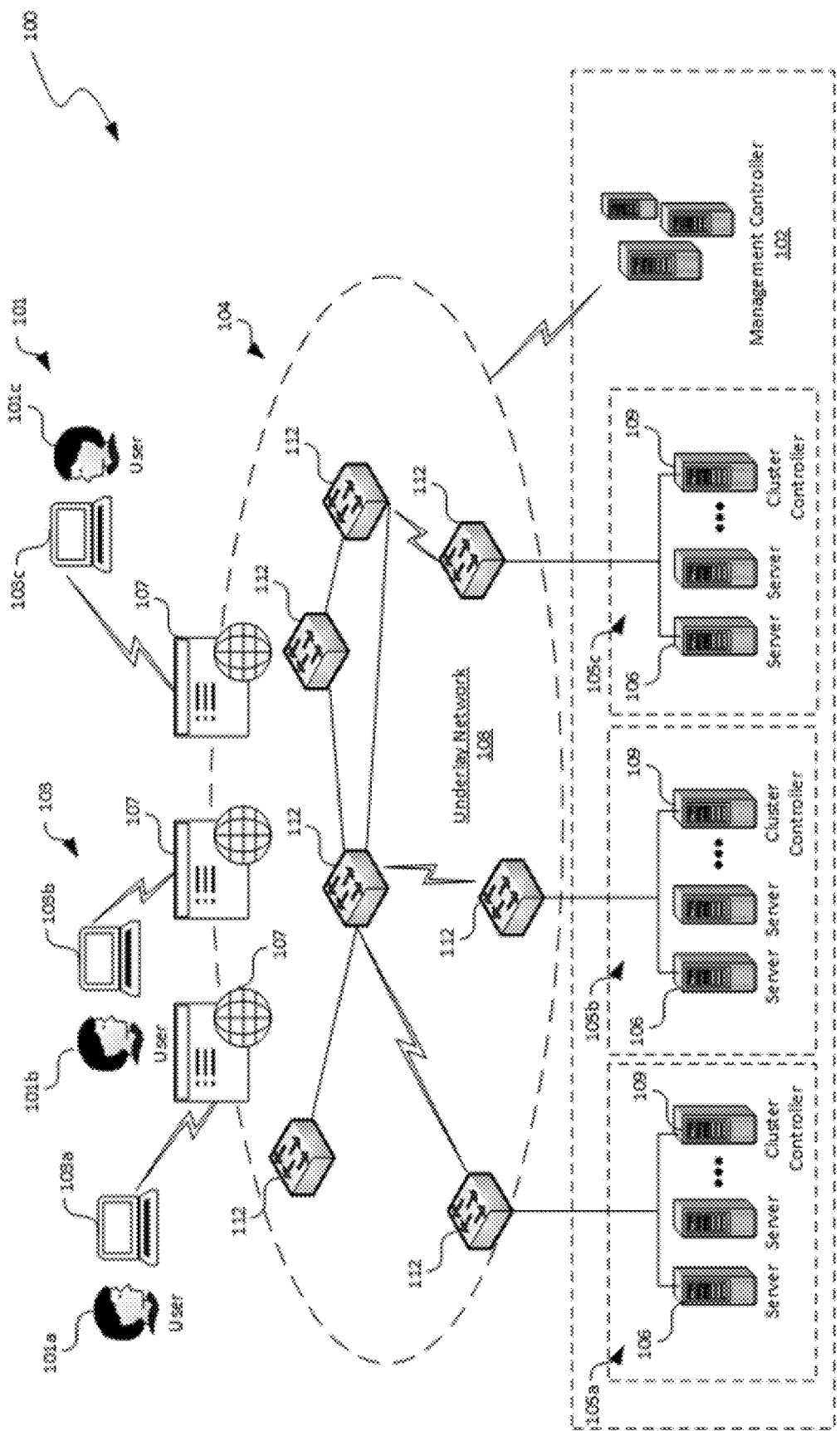
FIG. 1 is a schematic diagram of a distributed computing system with servers implementing software filtered memory devices in accordance with embodiments of the disclosed technology.

Certain embodiments of computing systems, devices, components, modules, routines, and processes for software filtered memory devices in distributed computing systems are described below. In the following description, specific details of components are included to provide a thorough understanding of certain embodiments of the disclosed technology. A person skilled in the relevant art can also understand that the disclosed technology may have additional embodiments or may be practiced without several of the details of the embodiments described below with reference to FIGS. 1-8. Even though the disclosed technology is described below in the context of distributed computing systems, embodiments of the disclosed technology can also be implemented in standalone desktop computers, laptop computers, or other suitable types of computing devices.

As used herein, the term "computing cluster" generally refers to a computer system having a plurality of network devices that interconnect multiple servers or hosts to one another or to external networks (e.g., the Internet). One example of a computing cluster is one or more racks each holding multiple servers in a cloud computing datacenter (or portions thereof) configured to provide cloud services. One or more computing clusters can be interconnected to form a "computing fabric." The term "network device" generally refers to a network communications component. Example network devices include routers, switches, hubs, bridges, load balancers, security gateways, or firewalls. A "server" is a computing device configured to implement one or more virtual machines, virtual routers, virtual gateways, or other suitable virtualized or "guest" computing components. For example, a server can include one or more processors executing suitable instructions to provide a hypervisor configured to support a host and one or more virtual machines, containers, or other suitable types of guests on the server. A "host" generally refers to a software component executed in a parent partition on the server. A host can call the hypervisor and request creation of new child partitions in which virtual machines, containers, and/or applications are executed.

Also used herein, the term "non-volatile memory" or "persistent memory" generally refers to a type of computer storage devices that can retrieve stored information and data even after being power cycled. In contrast, volatile memory requires constant power in order to retain data. Examples of non-volatile memory can include read-only memory, flash memory, ferroelectric RAM, hard disk drives (HDDs), solid state drives (SSDs), floppy disks, and other suitable types of persistent storage devices. In certain implementations, a non-volatile memory can include a memory controller configured to interface with one or more software components (e.g., a host, a guest, etc.) on a server via a communications bus (e.g., a PCIe bus). For example, the memory controller can be configured to execute admin commands to effect one or more configuration changes on the non-volatile memory. Examples of configuration changes can include re-programming of firmware or setting one or more configuration parameters on the non-volatile memory. The memory controller can also be configured to execute data commands to effect read, write, erase, or other suitable data operations on the non-volatile memory.

Further, as used herein, a non-Volatile Memory express (NVMe) interface is a logical device interface or memory interface for accessing a non-volatile memory attached to a sever via a computer bus (e.g., a PCIe bus). An NVMe interface allows a guest to have full access to a non-volatile memory as if the non-volatile memory is attached directly to the guest. For example, an SSD attached to a server can be directly assigned to a virtual machine hosted by the server via an NVMe interface as if the SSD is directly attached to the virtual machine. Such direct attachment via the NVMe interface can allow the virtual machine to access the non-volatile memory via, for example, a PCIe bus, thus reducing input/output (I/O) overhead and latency of accessing data from the SSD by the virtual machine when compared to other logical device interfaces.

The virtual machine can include a memory driver configured to issue one or more commands to the non-volatile memory and monitor execution results of such commands in order to access and/or control the non-volatile memory. To facilitate the foregoing operations, in certain implementations, the virtual machine may allocate certain memory spaces for guest admin queues to facilitate command issuance and execution results monitoring. For example, the guest admin queues can include a guest admin submission queue (gASQ) configured to contain a list of command entries and a guest admin completion queue (gACQ) configured to contain a list of execution result entries. In other implementations, the host or hypervisor may allocate suitable memory spaces for the guest admin queues.

In certain implementations, the gASQ and gACQ can be directly linked to corresponding registers on the memory controller of the non-volatile memory. As such, during operation, the memory controller can, upon receiving a doorbell signal from the memory controller, retrieve command entries from the gASQ and write execution results to the gACQ. One difficulty of allowing direct and full control of the non-volatile memory by the guest is that a user or application executing in the guest may perform harmful operations on the non-volatile memory. For example, a user may re-program firmware on the non-volatile memory to negatively impact data security of other virtual machines on the same server.

Several embodiments of the disclosed technology can address at least some aspects of the foregoing difficulty by implementing a software filtered memory interface that protects the non-volatile memory from guest attacks while allowing high performance in data access to the non-volatile memory. As such, harmful admin commands from the guest can be blocked from a non-volatile memory when the non-volatile memory is assigned to the guest. In certain implementations, both the gASQ and gACQ can be virtualized by corresponding host admin submission queue (hASQ) and host admin completion queue (hACQ). The hASQ and hACQ are directly linked to the corresponding registers of the memory controller instead of the gASQ and gACQ. In certain embodiments, the host or hypervisor can allocate certain memory spaces of the guest to the hASQ and hACQ. In other embodiments, the host or hypervisor can allocate memory spaces of the host or other suitable memory spaces to the host admin queues. In any of the foregoing embodiments, the hypervisor can refuse write access to the allocated memory spaces used for the hASQ by the guest to prevent the guest from sending harmful entries to the NVMe controller. Only the host can write to the hASQ.

During operation, a software filter implemented in, for instance, the host can monitor command entries written to the gASQ by the memory controller and determine whether the corresponding commands are allowed based on a list of pre-configured allowed or disallowed commands. If a command is not allowed, the software filter can be configured to generate a suitable completion entry representing, for instance, execution results without sending the command to the memory controller of the non-volatile memory. As such, harmful commands issued by the memory driver in the guest can be prevented from being executed in the non-volatile memory, as described in more detail below with reference to FIGS. 1-8.

FIG. 1 is a schematic diagram illustrating a distributed computing system 100 implementing software filtered memory devices in accordance with embodiments of the disclosed technology. As shown in FIG. 1, the distributed computing system 100 can include an underlay network 108 interconnecting a plurality of client devices 103 (shown as first, second, and third client devices 103a-103c, respectively) of corresponding users 101 (shown as first, second, and third user 101a-101c, respectively), and a computing fabric 104. Even though particular components are shown in FIG. 1, in other embodiments, the distributed computing system 100 can also include additional and/or different constituents. For example, the distributed computing system 100 can include network storage devices, utility infrastructures, and/or other suitable components in addition to or in lieu of those shown in FIG. 1.

The client devices 103 can each include a computing device that facilitates corresponding users 101 to access cloud services provided by the servers 106 via the underlay network 108. For example, in the illustrated embodiment, the client devices 103 individually include a desktop computer. In other embodiments, the client devices 103 can also include laptop computers, tablet computers, smartphones, or other suitable computing devices. Even though three users 101 are shown in FIG. 1 for illustration purposes, in other embodiments, the distributed computing system 100 can facilitate any suitable number of users 101 to access suitable types of computing services provided by the servers 106.

As shown in FIG. 1, the underlay network 108 can include one or more physical network devices 112 that interconnect the client devices 103 and the computing fabric 104. Examples of the network devices 112 can include routers, switches, firewalls, load balancers, or other suitable network components. Even though particular connection scheme is shown in FIG. 1 for illustration purposes, in other embodiments, the network devices 112 can be operatively coupled in a hierarchical, flat, "mesh," or other suitable topologies.

The computing fabric 104 can include a management controller 102 and a plurality of servers 106 operatively coupled to one another by the network devices 112. In certain embodiments, the servers 106 can individually include a physical server or a computing blade having several physical servers. In other embodiments, the servers 106 can also include one or more physical servers with multiple processor cores, or other suitable types of computing devices. In any of the foregoing embodiments, the servers 106 can individually include one or more non-volatile memories (shown as NVMs 138 in FIG. 2).

The servers 106 can be organized into racks, availability zones, groups, sets, computing clusters, or other suitable divisions. For example, in the illustrated embodiment of FIG. 1, the servers 106 are grouped into three computing clusters 105 (shown individually as first, second, and third computing clusters 105a-105c, respectively), which are operatively coupled to corresponding network devices 112 in the underlay network 108. Even though three computing clusters 105 are shown in FIG. 1 for illustration purposes, in other embodiments, the computing fabric 104 can include one, two, eight, sixteen, or any other suitable numbers of computing clusters 105 with similar or different components and/or configurations.

Each cluster 105 can also include a cluster controller 109 configured to monitor status and manage operations of the servers 106 in the corresponding computing cluster 105. For example, the cluster controller 109 can monitor whether a host 106 or components thereof has failed. In response to detecting a failure of the host 106 or components thereof, the cluster controller 109 can attempt to remedy the detected failure by, for instance, migrating virtual machines hosted on the failed host 106 to other servers 106 in the same cluster 105, restarting the failed host 106, replacing hardware components of the failed host 106, and/or perform other suitable operations. Though the cluster controllers 109 are shown as separate physical servers in FIG. 1, in other embodiments, the cluster controllers 109 can also include computing services provided by one or more of the servers 106 in corresponding computing clusters 105.

The management controller 102 can be configured to monitor, control, or otherwise manage operations of the computing clusters 105. For example, in certain embodiments, the management controller 102 can include a fabric controller configured to manage processing, storage, communications, or other suitable types of hardware resources in the computing clusters 105 for hosting desired computing services. In other embodiments, the management controller 102 can also include a datacenter controller, application delivery controller, or other suitable types of controller. In the illustrated embodiment, the management controller 102 is shown as being separate from the computing clusters 105. In other embodiments, the management controller 102 can include one or more servers 106 in the computing clusters 105. In further embodiments, the management controller 102 can include software services hosted on one or more of the servers 106 in the computing clusters 105.

In operation, the users 101 can request various computing services (e.g., deployment of a site) via, for example, user portals 107 presented on corresponding client devices 103. In response, the management controller 102 can allocate one or more servers 106 or other computing resources (e.g., one or more servers 106) to execute suitable instructions to provide the requested computing services. In order to improve performance of the provided computing services, in certain implementations, the servers 106 can assign one or more non-volatile memories 138 to be accessed by a virtual machine 144 (FIG. 2) via a PCIe bus. To prevent harmful operations being performed by the non-volatile memories 138, several embodiments of the disclosed technology are directed to implementing a software filter on the individual servers 106 such that only certain commands from the virtual machines 144 are allowed to be performed on the assigned non-volatile memories 138, as described in more detail below with reference to FIGS. 3A-4B.

Figure 2:
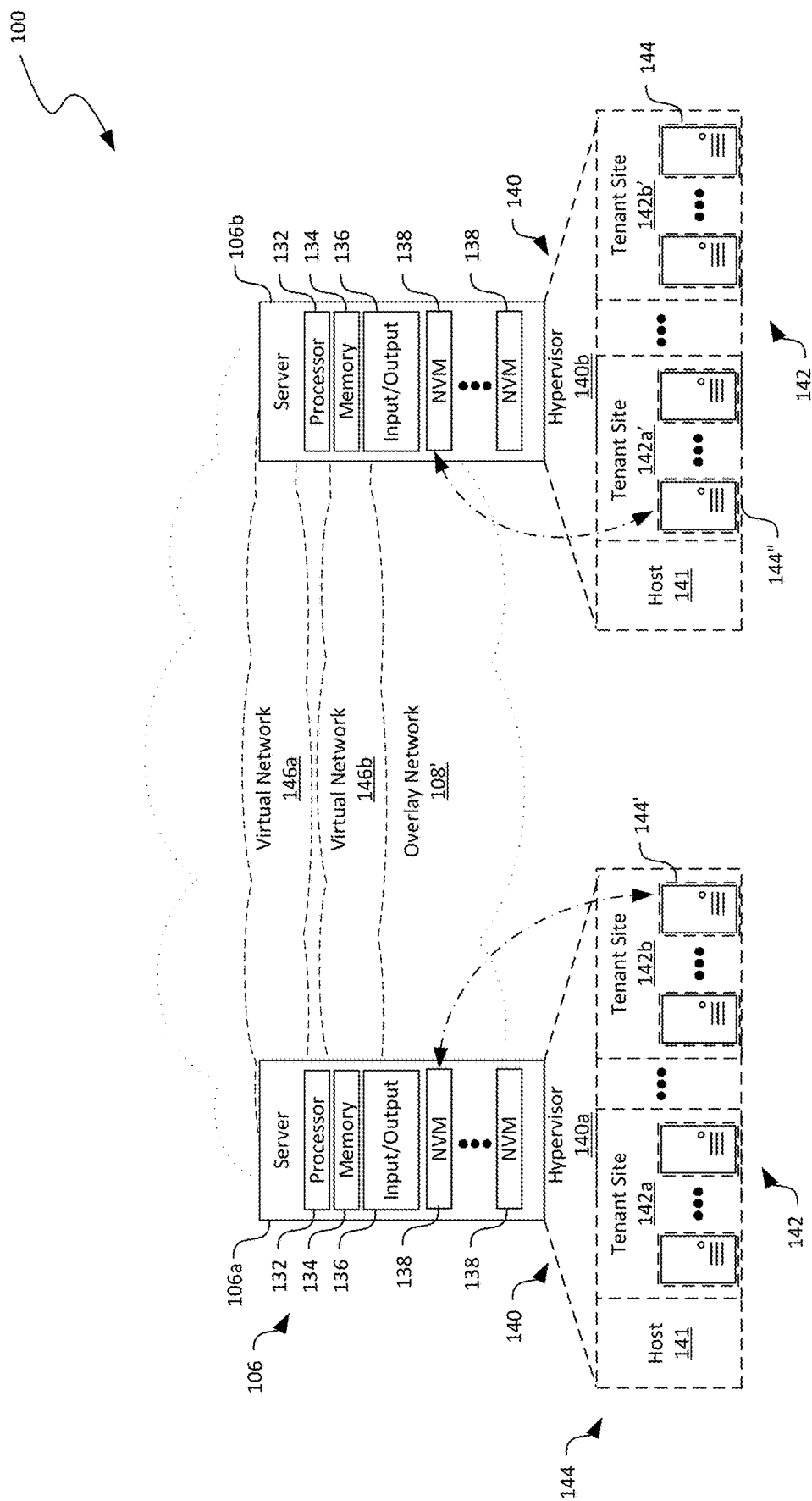
FIG. 2 is a schematic diagram illustrating certain hardware/software components of servers in the distributed computing system of FIG. 1 in accordance with embodiments of the disclosed technology.

FIG. 2 is a schematic diagram illustrating certain hardware/software components of the distributed computing system 100 of FIG. 1 in accordance with embodiments of the disclosed technology. In FIG. 2 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads). In certain embodiments, the various components and modules described below can be implemented with actors. In other embodiments, generation of the application and/or related services can also be implemented using monolithic applications, multi-tiered applications, or other suitable components.

Components within a system can take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry.

A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2, the first server 106a and the second server 106b can each include a processor 132, a memory 134, an input/output component 136, and one or more non-volatile memories 138 operatively coupled to one another. The processor 132 can include a microprocessor, a field-programmable gate array, and/or other suitable logic devices. The memory 134 can include volatile and/or non-volatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIGS. 5A-7). The input/output component 136 can include a network interface card or other suitable types of input/output devices configured to accept input from and provide output to an operator and/or an automated software controller (not shown).

The memory 134 of the first and second servers 106a and 106b can include instructions executable by the corresponding processors 132 to cause the individual servers 106 to provide a hypervisor 140 (identified individually as first and second hypervisors 140a and 140b) and other suitable virtual components such as virtual network interface card, virtual switches, etc. (not shown). The hypervisors 140 can individually be configured to initiate, monitor, terminate, and/or otherwise locally manage a host 141 and one or more virtual machines 144 (or containers) organized into tenant sites 142. For example, as shown in FIG. 2, the first server 106a can provide a first hypervisor 140a that manages first and second tenant sites 142a and 142b, respectively, for the same or different tenants or users 101 (FIG. 1). The second server 106b can provide a second hypervisor 140b that manages first and second tenant sites 142a' and 142b', respectively.

The hypervisors 140 can be software, firmware, or hardware components. The tenant sites 142 can each include multiple virtual machines 144 or other suitable tenant instances for a tenant. For example, the first server 106a and the second server 106b can both host the tenant site 142a and 142a' for a first user 101a (FIG. 1). The first server 106a and the second server 106b can both host the tenant site 142b and 142b' for a second user 101b (FIG. 1). Each virtual machine 144 can be executing a corresponding operating system, middleware, and/or applications.

Also shown in FIG. 2, the distributed computing system 100 can include one or more virtual networks 146 that interconnect the tenant sites 142a and 142b across multiple servers 106. For example, a first virtual network 142a interconnects the first tenant sites 142a and 142a' at the first server 106a and the second server 106b. A second virtual network 146b interconnects the second tenant sites 142b and 142b' at the first server 106a and the second server 106b. Even though a single virtual network 146 is shown as corresponding to one tenant site 142, in other embodiments, multiple virtual networks 146 (not shown) may be configured to correspond to a single tenant site 146.

The virtual machines 144 on the virtual networks 146 can communicate with one another via the underlay network 108 (FIG. 1) even though the virtual machines 144 are located on different servers 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machine 144 in a virtual network 146. Thus, different virtual networks 146 can use one or more virtual network addresses that are the same. Example virtual network addresses can include IP addresses, MAC addresses, and/or other suitable addresses.

As shown in FIG. 2, the hypervisor 140 and/or the host 141 can assign one or more of the non-volatile memories 138 to be accessed by a virtual machine 144 via a PCIe bus. For example, the first server 106a can assign a non-volatile memory 138 to the virtual machine 144'. The second server 106b can assign another non-volatile memory 138 to the virtual machine 144". As alluded to above, to prevent harmful operations being performed by the non-volatile memories 138, several embodiments of the disclosed technology are directed to implementing a software filter on the individual servers 106 such that only certain commands from the virtual machines 144 are allowed to be performed on the assigned non-volatile memories 138, as described in more detail below with reference to FIGS. 3A-4B.

Figure 3A:
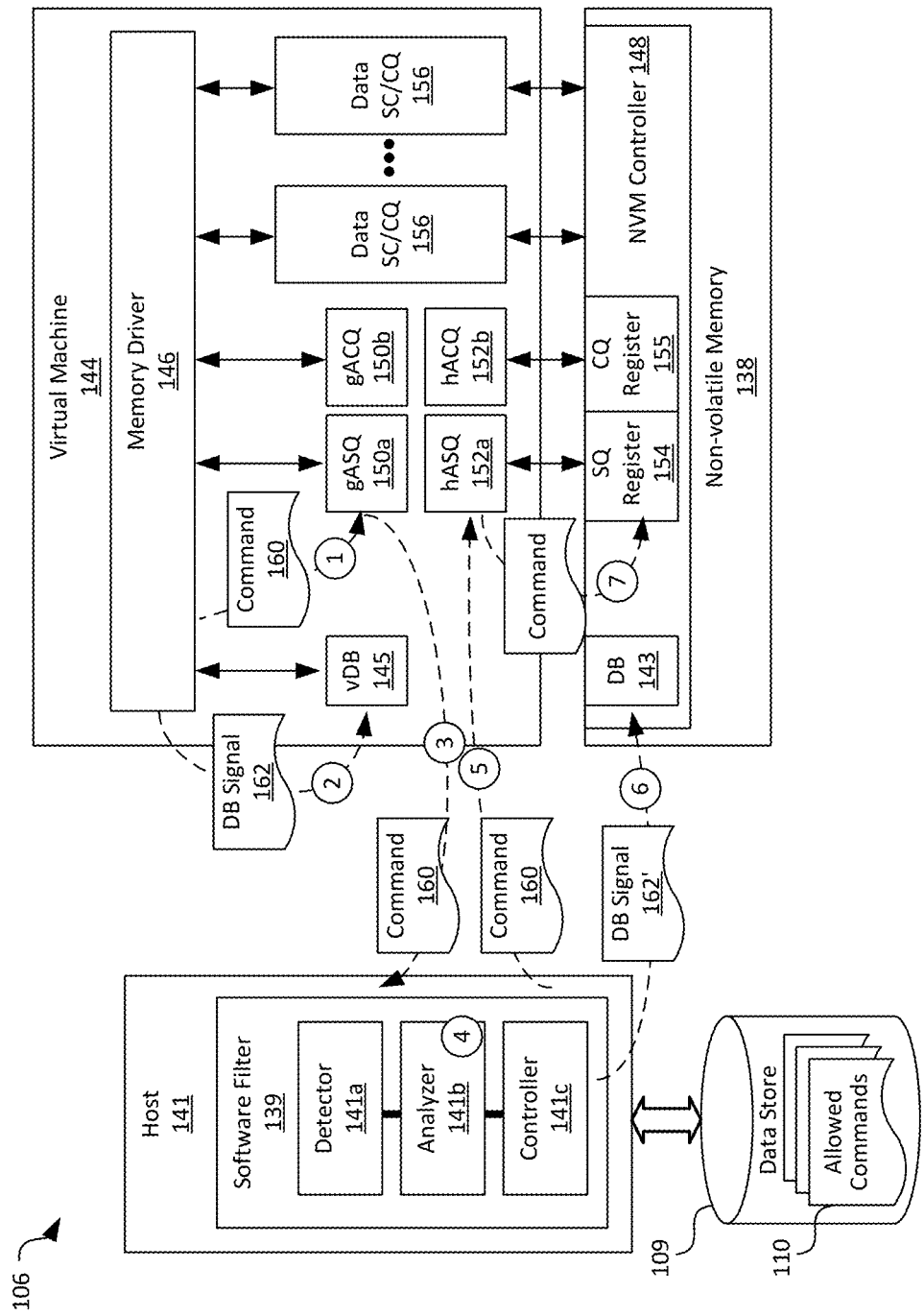
FIGS. 3A-3C are schematic diagrams illustrating certain hardware/software components of a server in FIGS. 1 and 2 operating in a filtered mode in accordance with embodiments of the disclosed technology.
Figure 3B:
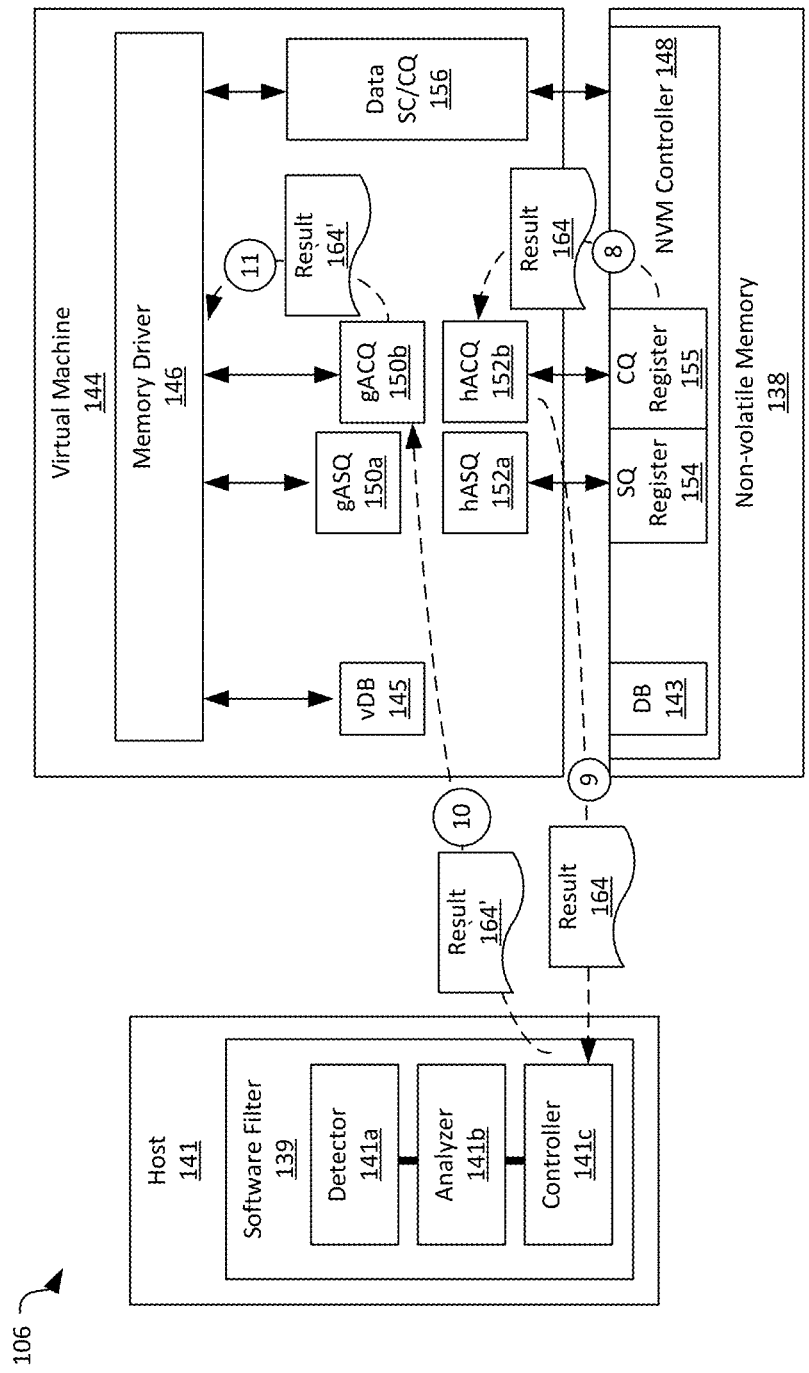

FIGS. 3A-3B are schematic diagrams illustrating certain hardware/software components of a sever 106 in the distributed computing system 100 in accordance with embodiments of the disclosed technology. As shown in FIG. 3A, the server 106 can execute suitable instructions to provide a host 141 operatively coupled to a virtual machine 144. The server 106 can include a non-volatile memory 138 having an NVM controller 148 with a doorbell register 143 (shown as DB 143), a submission register 154 (shown as SQ register 145), and a completion register 155 (shown as CQ register 145). Even though the virtual machine 144 is used as an example of a guest hosted on the server 106, in other embodiments, the guest can also include a container, an application, or other suitable components.

The virtual machine 144 can include a memory driver 146 configured to interface with the non-volatile memory 138. In order to facilitate accessing the non-volatile memory 138, the virtual machine 144 can also include guest admin queues 150 (shown as gASQ 150a and gACQ 150b) and one or more data queues 156 (shown as data SC/CQ queues). As shown in FIG. 3A, the host 141 and/or the hypervisor 140 (FIG. 2) can assign the non-volatile memory 138 to the virtual machine 144. As a result, the virtual machine 144 can access the non-volatile memory 138 directly as if the non-volatile memory 138 is directly attached to the virtual machine 144. A benefit of such direct access is that the virtual machine 144 can reach a high level of performance that the non-volatile memory 138 supports. A downside of such direct access is that the virtual machine 144 (or applications executing therein) can issue potentially harmful commands to the non-volatile memory 138, such as those to re-program firmware of the NVM controller 148.

In accordance with embodiments of the disclosed technology, during initial setup of the non-volatile memory 138 by the virtual machine 144, the host 141 (or the hypervisor 140) can intercept a setup request by the memory driver 146 to deploy the gASQ 150a and gACQ 150b. In response to the intercepted setup request, the host 141 can deploy corresponding hASQ 152a and hACQ 152b corresponding to the gASQ 150a and gACQ 150b in the guest memory address space and configure the non-volatile memory 138 to be directly linked to the hASQ 152a and hACQ 152b instead of gASQ 150a and gACQ 150b. Thus, the NVM controller 148 of the non-volatile memory 138 is configured to retrieve admin commands from the hASQ 152a into, for example, the SQ register 154 and write execution results from, for example, the CQ register 155 to the hACQ 152b. The host 141 can also place an intercept on a doorbell signal issued by the memory driver 146. The intercepted doorbell signal is shown in FIG. 3A as vDB 145.

As shown in FIG. 3A, the host 141 can also include a software filter 139 configured to perform software filtering of admin commands issued by the memory driver 146 of the virtual machine 144. The software filter 139 can be operatively coupled to a data store 109 containing a listed of allowed commands 110 (and/or disallowed commands, not shown). In the illustrated embodiment, the software filter 139 can include a detector 141a, an analyzer 141b, and a controller 141c. In other embodiments, the software filter 139 can include interface, network, and/or other suitable types of components. In FIG. 3A and other figures herein, particular operations of the software filter 139 are shown with a numeral in a circle for illustration purposes. Additional and/or different operations may also be included in the software filtering operations.

As shown in FIG. 3A, the detector 141a can be configured to monitor for new entries of command 160 written to the gASQ 150a by the memory driver 146 (shown as operation 1) or a doorbell signal 162 issued by the memory driver 146 (shown as operation 2). Such monitoring can include, for instance, monitoring for data changes (e.g., via flag bits) in a memory space allocated to the gASQ 150a, or detecting the doorbell signal 162 with the placed intercept. In certain embodiments, the NVM controller 148 can have a configuration space that include device registers or pages (e.g., the doorbell register 143, the SQ register 154, and the CQ register 155). The host 141 can be configured to always intercept any configuration pages that are not the doorbell 143. Such intercept can allow the host 141 to virtualize other aspects of the NVM controller, such as onboard controller memory. Upon detecting the new entry of command 160 and/or the doorbell signal 162 (shown as operation 3), the detector 141a can retrieve the command 160 from the gASQ 150a and provide the retrieved command 160 to the analyzer 141b for analysis to determine whether the command 160 is allowed.

The analyzer 141b can be configured to determine whether the command 160 is allowed based on the list of allowed command 110 in the data store 109 (shown as operation 4). For example, in one embodiment, when the list of allowed commands 110 does not contain the retrieved command 160, the analyzer 141b can determine that the command 160 is not allowed. In another example, as shown in FIG. 3A, when the list of allowed commands 110 includes the retrieved command 160, the analyzer 141b can indicate that the command 160 is allowed. The analyzer 141b can then provide the indication to the controller 141c for further processing.

The controller 141c can be configured to process the retrieved command 160 based on the indication from the analyzer 141b regarding whether the command 160 is allowed. For example, as shown in FIG. 3A, when the indication from the analyzer 141b indicates that the command 160 is allowed, the controller 141c can be configured to copy the command 160 as a new entry to the hASQ 152a (shown as operation 5). The controller 141c can then issue another doorbell signal 162' to the doorbell register 143 indicating to the NVM controller 148 the existence of the new entry containing the command 160 in the hASQ 152a. In response to receiving the doorbell signal 162', the NVM controller 148 can be configured to retrieve the command 160 from the hASQ 152a (shown as operation 7) and executes the command 160.

As shown in FIG. 3B, subsequent to executing the command 160 (FIG. 3A), the NVM controller 148 can write execution result 164 as a new entry in the hACQ 152b. The detector 141a can be configured to detect the presence of the new entry in the hACQ 152b by continuously or periodically poll the hACQ 152b. Upon detecting the new entry in the hACQ 152b, the controller 141c can be configured to retrieve the new entry containing the result 164 from the hACQ 152b and optionally modify the result 164 to, for instance, remove certain comments, reports, or other suitable types of data from the result 164. The controller 141c can then be configured to create a new entry in the gACQ 150b with the optionally modified result 164' (shown as operation 10). The controller 141c can then inform the memory driver 146 that a new entry is present in the gACQ 150b by, for instance, activating an interrupt of the virtual machine 144. In response, the memory driver 146 can retrieve the new entry of the result 164' and process the result 164' accordingly.

Figure 3C:
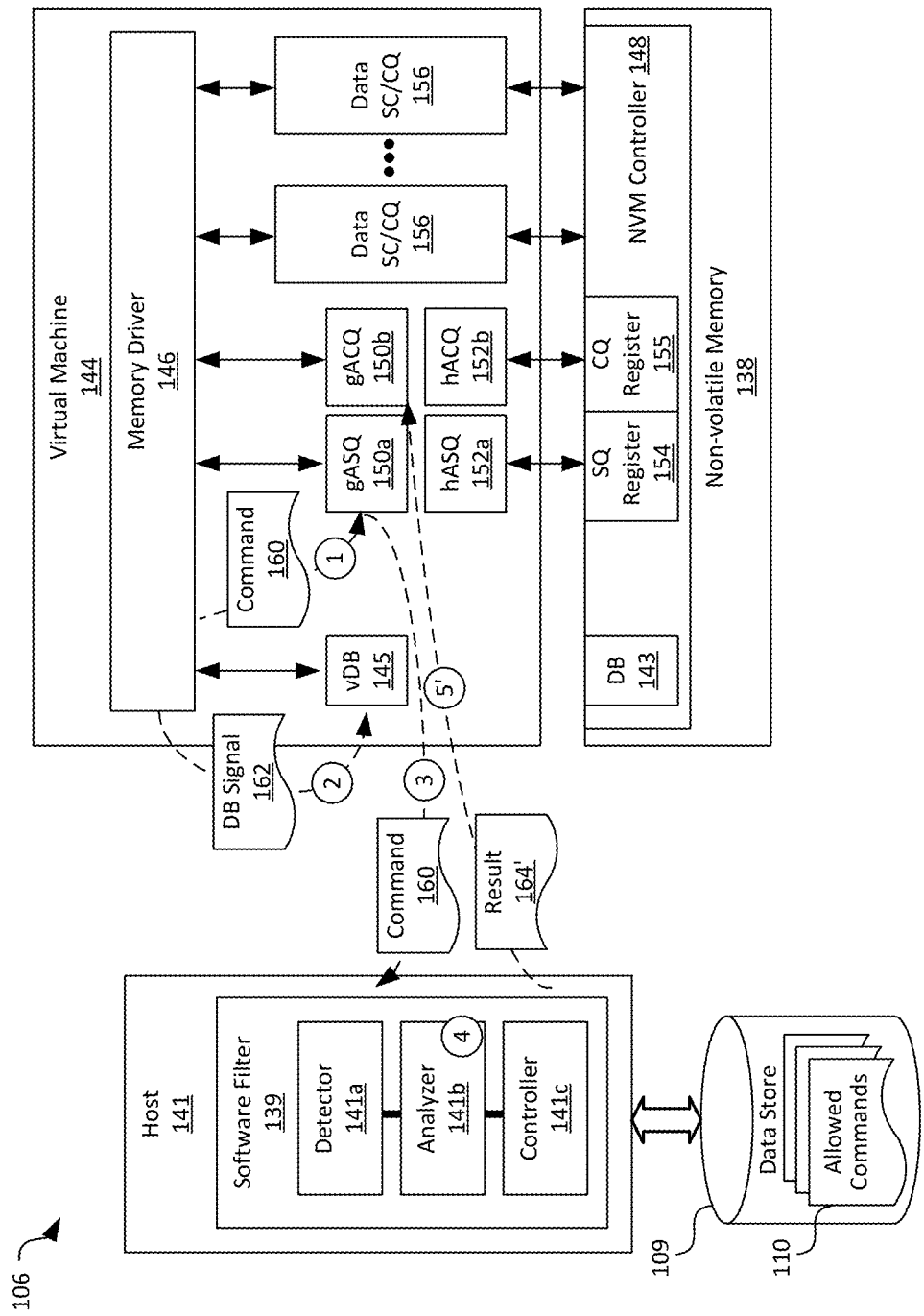

FIG. 3C shows example operations when the analyzer 141b determines that the command 160 is not allowed. As shown in FIG. 3C, in response to receiving an indication from the analyzer 141b that the command 160 is not allowed, the controller 141c can be configured to generate an execution result 164 to the command 160 without sending the command 160 to the hASQ 152a or transmit the doorbell signal 162' to the doorbell register 143 of the NVM controller 148. The generated result 164 can contain various remarks, comments, or other suitable types of data. For example, the generated result 164 can include a status code stating that the command 160 is not allowed, supported, or otherwise not available. In other examples, the generated result 164 can also include other suitable types of data indicating that execution of the command 160 has failed. The controller 141c can then be configured to create a new entry in the gACQ 150b with the generated result 164 (shown as operation 5') and inform the memory driver 146 that a new entry is present in the gACQ 150b by, for instance, activating an interrupt of the virtual machine 144. In response, the memory driver 146 can retrieve the new entry of the result 164' and process the result 164' accordingly.

Thus, as described above with reference to FIGS. 3A-3C, by virtualizing the gASQ and gACQ and the doorbell signal 162, several embodiments of the disclosed technology can prevent the virtual machine 144 (or any components thereof) from directly issuing harmful admin commands to the NVMe controller 148 of the non-volatile memory 138. Thus, operating security on the server 106 may be improved.

Though the foregoing technique is effective in preventing the virtual machine 144 from directly issuing harmful commands to the NVMe controller 148, continued software filtering of commands 160 in the gASQ 150*a* may generate high latency of processing commands 160 and thus reduce data access performance of the non-volatile memory 138. To address the foregoing issue, several embodiments of the disclosed technology are also directed to operate the non-volatile memory 138 in a filter mode as described with reference to FIGS. 3A-3B or a unfiltered mode under certain conditions in order to achieve faster data access performance, as described below with reference to FIGS. 4A and 4B.

Figure 4A:
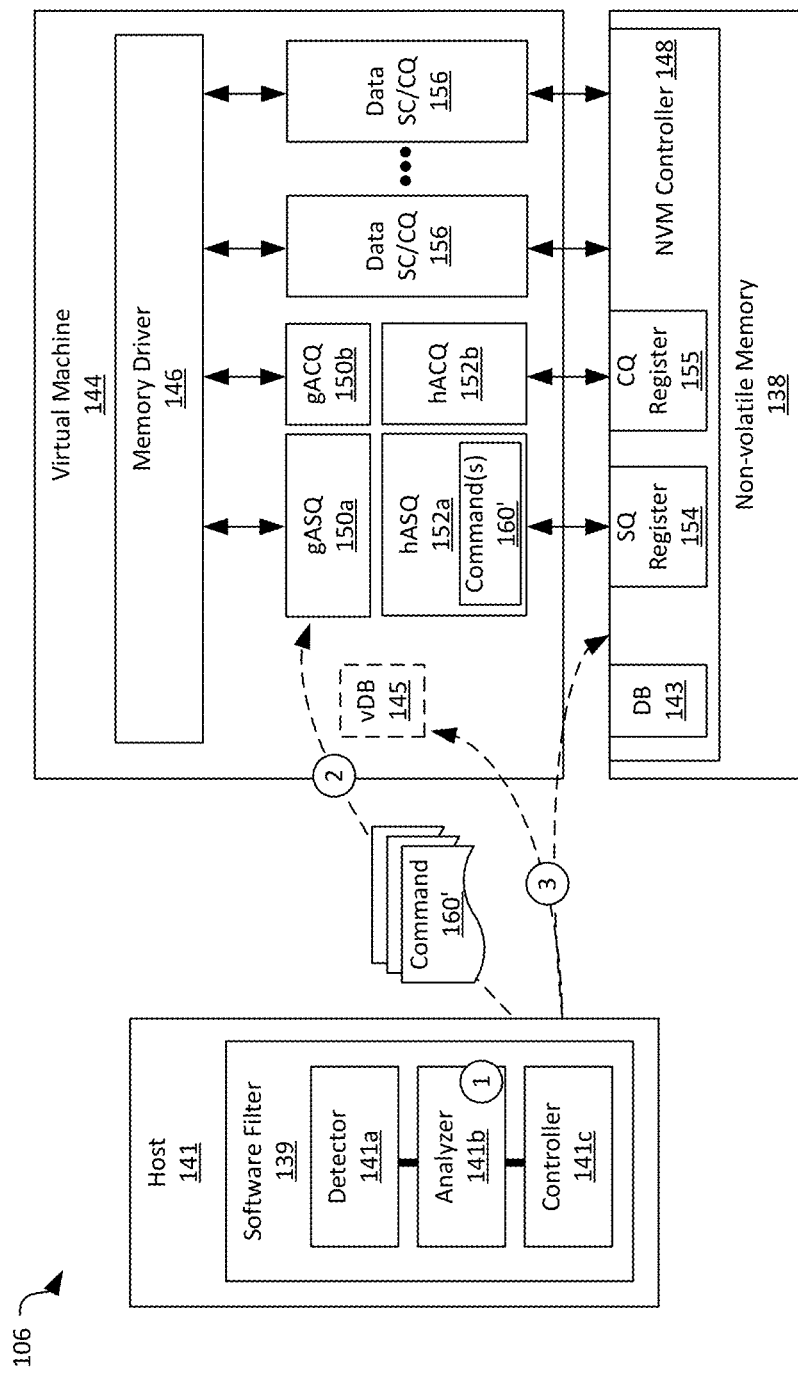
FIGS. 4A and 4B are schematic diagrams illustrating certain hardware/software components of a server in FIGS. 1 and 2 operating in a unfiltered mode in accordance with embodiments of the disclosed technology.

As shown in FIG. 4A, during operation, the detector 141*a* can be configured to continuously monitoring for new entries of commands in the gASQ 150*a* and track an elapsed time since a last new entry to the gASQ 150*a* was detected. The analyzer 141*b* can then be configured to determine whether the elapsed time has exceeded a period threshold (e.g., 10 minutes), shown in FIG. 4A as operation 1. In response to determining that the elapsed time has not exceeded the period threshold, the controller 141*c* can be configured to cause the non-volatile memory 138 to operate in the filtered mode, as described above with reference to FIGS. 3A-3B.

In response to determining that the elapsed time has exceeded the period threshold, the controller 141*c* can be configured to cause the non-volatile memory 138 to operate in the unfiltered mode by, for instance, removing the placed intercept on the doorbell signal 162 (FIG. 3A). Optionally, in certain embodiments, before performing the foregoing operation 3, the controller 141*c* can also be configured to insert one or more commands 160' that are deemed to be safe commands (e.g., get-feature commands) in the hASQ 152*a*. As such, even if the memory driver 146 issues a doorbell signal 162 before issuing any commands to the gASQ 150*a*, the NVMe controller 148 would process a harmless command 160' already in the hASQ 152*a* without causing negative effects on the non-volatile memory 138. In other embodiments, the host 141 can switch to unfiltered mode without filling the hASQ 152*a* with any commands 160' and/or perform other suitable actions.

Figure 4B:
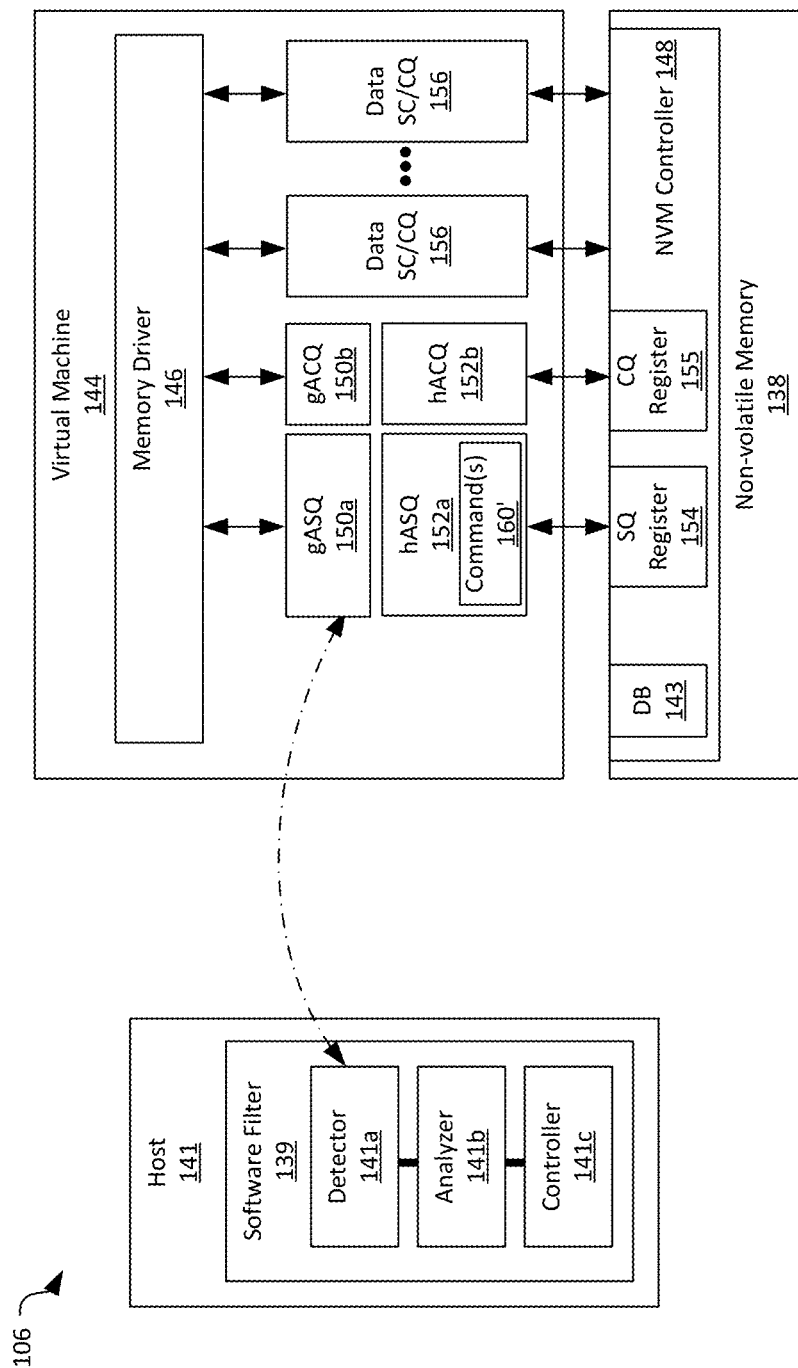

Thus, as shown in FIG. 4B, the memory driver 146 of the virtual machine 144 can have full access to the NVM controller 148 without any hinderance from the software filter 139 of the host 141. While operating in the unfiltered mode, the detector 141*a* can be configured to continuously monitoring for any new entry of commands issued by the memory driver 146 to the gASQ 150*a*. In response to detect a new entry issued by the memory driver 146 to the gASQ 150*a*, the controller 141*c* can be configured to immediately switch the operating mode back to the filtered mode, as described above with reference to FIG. 3A. As such, the host 141 can allow the virtual machine 144 to directly access data in the non-volatile memory 138 as long as the virtual machine 144 does not issue any admin commands by writing entries in the gASQ 150*a*. As such, data access by the virtual machine 144 to the non-volatile memory 138 can be improved when compared to continuous software filtering by the software filter 139.

FIGS. 5A-7 are flowcharts illustrating various processes of software filtered memory devices in a distributed computing system in accordance with embodiments of the disclosed technology. Though the processes are described below in the context of the distributed computing system 100 of FIGS. 1-4B, in other embodiments, the processes may be performed in other computing systems or devices with additional and/or different hardware/software components.

Figure 5A:
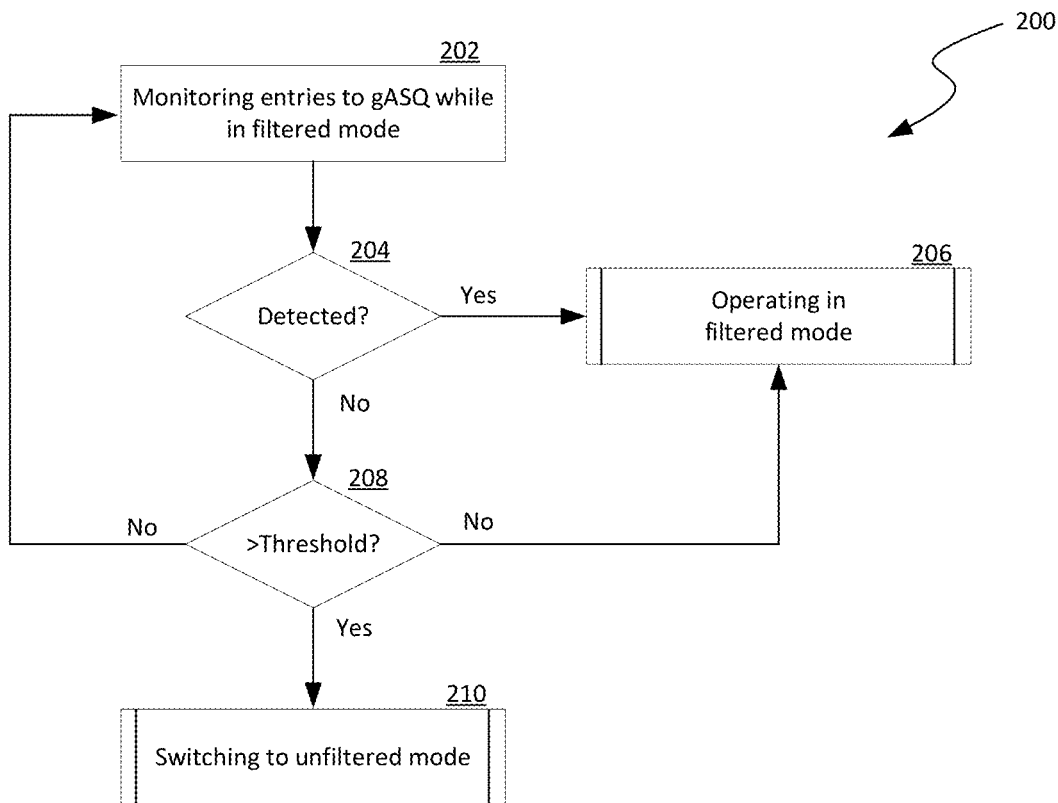
FIGS. 5A-7 are flowcharts illustrating various processes of software filtered memory devices in a distributed computing system in accordance with embodiments of the disclosed technology.

FIG. 5A illustrates a process 200 of switching the non-volatile memory 138 (FIG. 3A) from a filtered mode to an unfiltered mode in accordance with embodiments of the disclosed technology. As shown in FIG. 5A, the process 200 can include monitoring for one or more new entries of admin commands written to the gASQ 150*a* (FIG. 3A) while in a filtered mode at stage 202. Example monitoring techniques are described above with reference to FIGS. 3A-3C. The process 200 can then include a decision stage 204 to determine whether a new entry to the gASQ 150*a* has been detected. In response to determining that a new entry to the gASQ 150*a* has been detected, the process 200 can include continue operating in the filtered mode and resetting an elapsed timer configured to measure an elapsed time from the last detected new entry to the gASQ 150*a* at stage 206. Examples of operations under the filtered mode are described below in more detail with reference to FIG. 6.

In response to determining that a new entry to the gASQ 150*a* has not been detected, the process 200 can include another decision stage 208 to determine whether an elapsed time since a last new entry was detected exceeds a preset period threshold. In response to determining that the elapsed time exceeds the threshold, the process 200 can include switching operation of the non-volatile memory 138 from the filtered mode to the unfiltered mode at stage 210. Examples of operations under the unfiltered mode are described below in more detail with reference to FIG. 7.

Figure 5B:
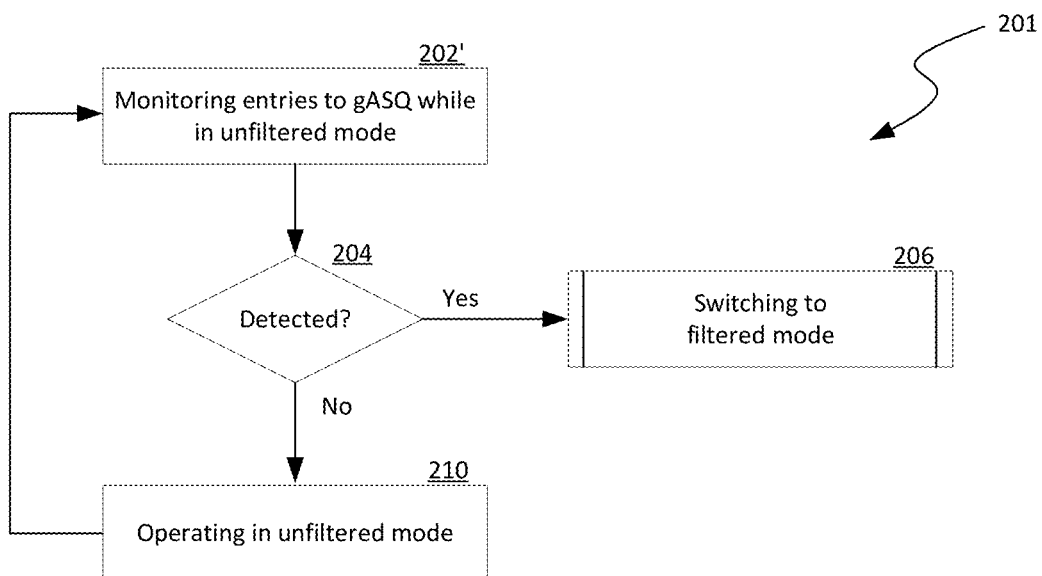

FIG. 5B illustrates a process 201 of switching the non-volatile memory 138 (FIG. 3A) from a unfiltered mode to an filtered mode in accordance with embodiments of the disclosed technology. As shown in FIG. 5B, the process 201 can include monitoring for one or more new entries of admin commands written to the gASQ 150*a* (FIG. 3A) while in a unfiltered mode at stage 202'. The process 201 can then include a decision stage 204 to determine whether a new entry has been detected. In response to determining that a new entry has been detected, the process 201 can include switching to the filtered mode at stage 206. Otherwise, the process 201 can include continuing operating in the unfiltered mode at stage 210.

Figure 6:
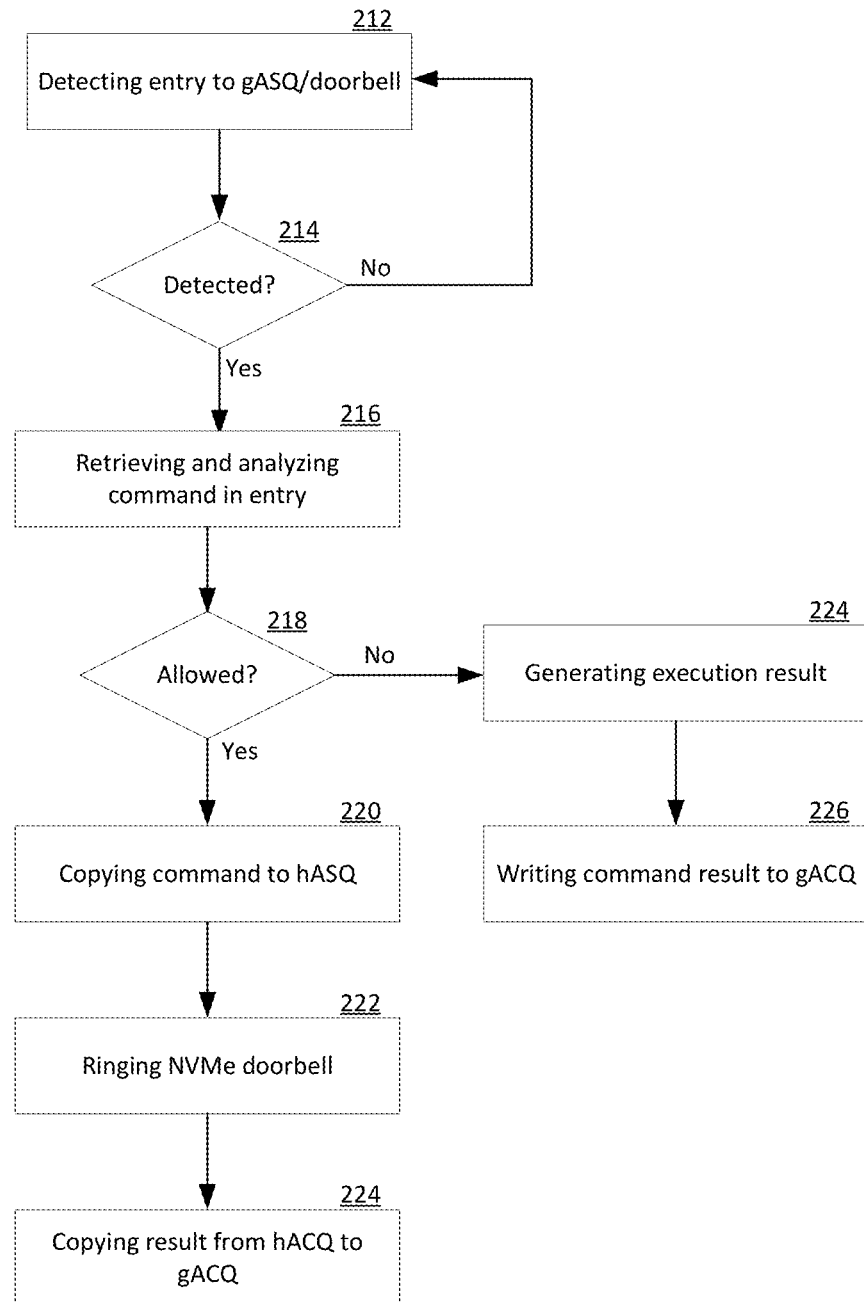

FIG. 6 illustrates example operations of operating the non-volatile memory 138 (FIG. 3A) in a filtered mode. As shown in FIG. 6, the operations can include detecting an entry of command written to the gASQ 150*a* (FIG. 3A) or issuance of a doorbell signal 162 (FIG. 3A) by the memory controller 146 (FIG. 3A) of a guest, such as the virtual machine 144 (FIG. 3A). The operations can then include a decision stage 214 to determine whether an entry has been detected. In response to determining that an entry has not been detected, the operations revert to detecting the entry at stage 212.

In response to determining that an entry has been detected, the operations can include retrieving the entry from the gASQ 150*a* at stage 216. The operations can then include another decision stage 218 to determine whether the command in the retrieved entry is allowed based on, for example, a list of allowed commands 110 (FIG. 3A), or a list of disallowed commands. In response to determining that the command is not allowed, the operations can include generating an execution result without sending the command to the non-volatile memory 138 at stage 224 and then writing the generated execution result to the gACQ 150*b* (FIG. 3A) as a new entry at stage 226. In response to determining that the command is allowed, the operations can include copying the command as a new entry to the hASQ 152*a* that is directly linked to the non-volatile memory 138 at stage 220 and ringing a doorbell of the non-volatile memory 138 at stage 222. The operations can then include detecting a new entry of execution result to the hACQ 152*b* (FIG. 3A) and copying the execution result to the gACQ 150*b* (FIG. 3A) from the hACQ 152*b*.

Figure 7:
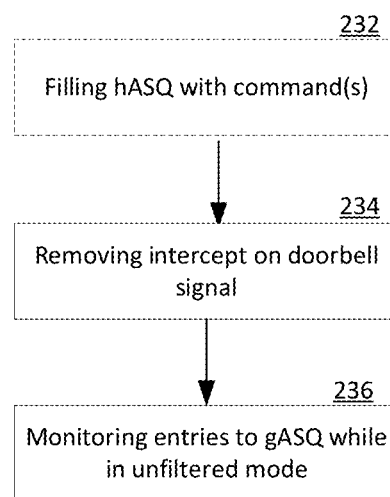

FIG. 7 illustrates example operations of switching operation of the non-volatile memory 138 (FIG. 3A) from a filtered mode to an unfiltered mode. As shown in FIG. 7, the operations can optionally include filling the hASQ 152*a* (FIG. 3A) with commands deemed to be harmless at stage 232. Subsequently, the operations can include removing intercept on a doorbell signal to the non-volatile memory 138 at stage 234. The operations can then include monitoring for new entries to the gASQ 150*a* (FIG. 3A) while in the unfiltered mode at stage 236.

Figure 8:
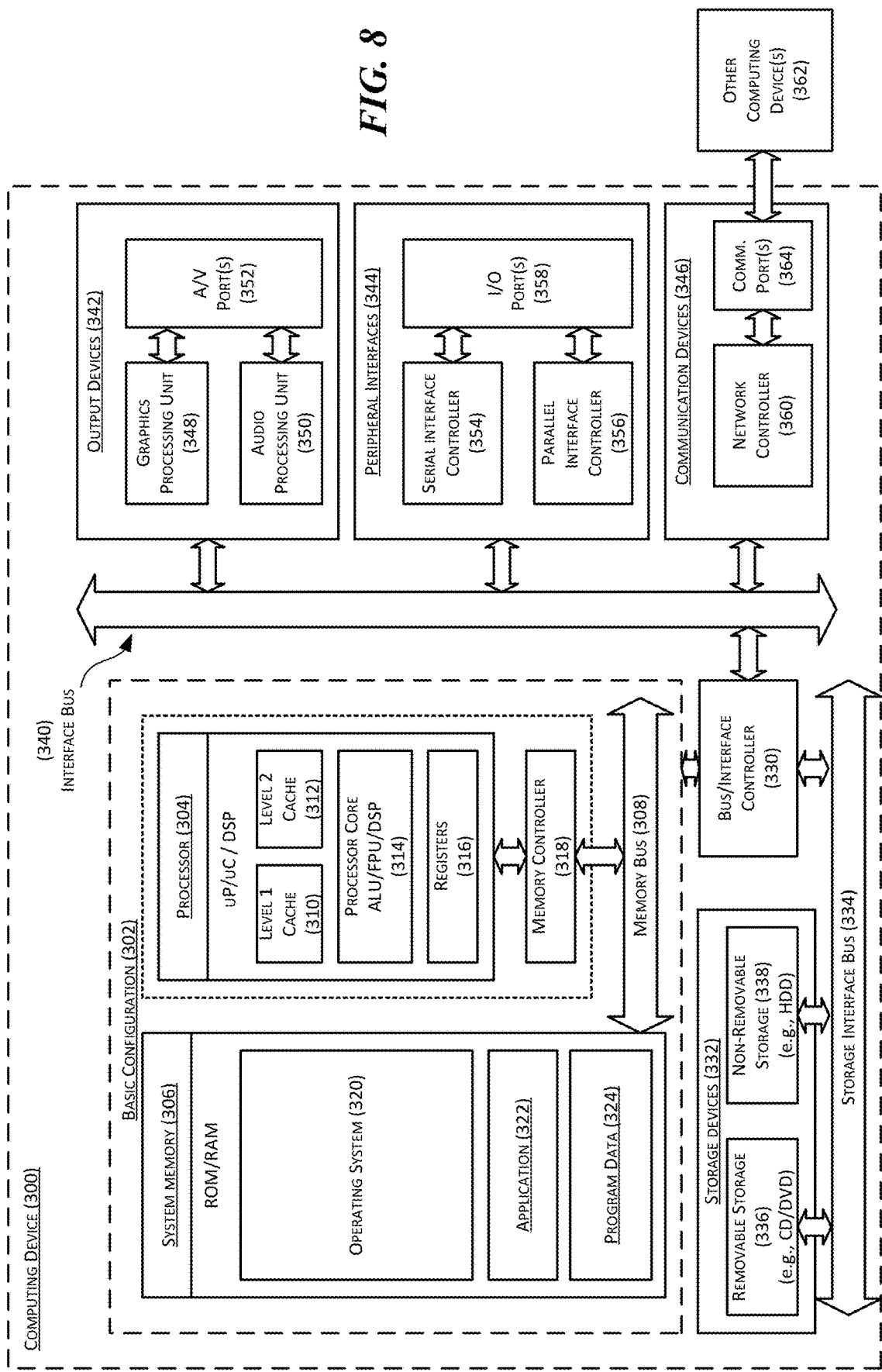
FIG. 8 is a computing device suitable for certain components of the distributed computing system in FIG. 1.

FIG. 8 is a computing device 300 suitable for certain components of the distributed computing system 100 in FIG. 1. For example, the computing device 300 can be suitable for the servers 106, the management controller 102, or the cluster controller 109 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (μP), a microcontroller (μC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations, memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method that provides a guest access to a non-volatile memory associated with a computing device, the method comprising:
retrieving, from a guest queue, a command that has been submitted to the guest queue by the guest;
identifying a filtered command by determining that a type of the command is an allowed type of command;
submitting the filtered command to a host queue; and
transmitting a signal indicating that the filtered command has been submitted to the host queue.

2. The method of claim 1, further comprising:
receiving, at the host queue, an execution result based on processing of the filtered command by a controller; and
copying the execution result from the host queue to the guest queue.

3. The method of claim 2, further comprising transmitting a notification, to the guest, indicating that the execution result has been copied to the guest queue.

4. The method of claim 2, wherein the host queue comprises a host admin submission queue (hASQ) for receiving the filtered command and a host admin completion queue (hACQ) for receiving the execution result based on the processing of the filtered command by the controller.

5. The method of claim 1, wherein the allowed type of command is related to power management or error recovery.

6. The method of claim 1, wherein the guest comprises a virtual machine and the command is issued by a memory driver of the virtual machine.

7. A method that provides a guest access to a non-volatile memory associated with a computing device, the method comprising:
retrieving, from a guest queue, a command that has been submitted to the guest queue by the guest;
determining that a type of the command is a disallowed type of command, wherein the disallowed type of command is related to re-programming firmware or thermal management of the non-volatile memory; and
in response to determining that the type of the command is the disallowed type of command, generating a completion entry for the command without sending the command to the host queue.

8. The method of claim 7, wherein the completion entry includes data informing the guest that the type of the command is disallowed.

9. The method of claim 8, further comprising:
submitting the completion entry to the guest queue; and
transmitting a notification, to the guest, indicating that the completion entry has been submitted to the guest queue.

10. The method of claim 9, wherein the guest queue comprises a guest admin submission queue (gASQ) for receiving the command from the guest and a guest admin completion queue (gACQ) for receiving the completion entry.

11. The method of claim 7, wherein the guest comprises a virtual machine and the command is issued by a memory driver of the virtual machine.

12. A computing device that provides a guest access to a non-volatile memory, comprising:
a processor; and
the non-volatile memory operatively coupled to the processor, wherein the computing device contains instructions executable by the processor to cause the computing device to perform operations comprising:
retrieve, from a guest queue, a command that has been submitted to the guest queue by the guest;
identify a filtered command by determining that a type of the command is an allowed type of command;
submit the filtered command to a host queue; and
transmit a signal indicating that the filtered command has been submitted to the host queue.

13. The computing device of claim 12, wherein the operations further comprise:
receiving, at the host queue, an execution result based on processing of the filtered command by a controller; and
copying the execution result from the host queue to the guest queue.

14. The computing device of claim 13, wherein the operations further comprise further comprising transmitting a notification, to the guest, indicating that the execution result has been copied to the guest queue.

15. The computing device of claim 13, wherein the host queue comprises a host admin submission queue (hASQ) for receiving the filtered command and a host admin completion queue (hACQ) for receiving the execution result based on the processing of the filtered command by the controller.

16. The computing device of claim 12, wherein the allowed type of command is related to power management or error recovery.

17. The computing device of claim 12, wherein the guest comprises a virtual machine and the command is issued by a memory driver of the virtual machine.

* * * * *